United States Patent [19]

Beh-Forrest et al.

[11] Patent Number: 4,712,808
[45] Date of Patent: Dec. 15, 1987

[54] HOT MELT ADHESIVE COMPOSITION FOR BOOK HINGE JOINT

[75] Inventors: Eric Beh-Forrest, Doylestown, Pa.; Thomas P. Flanagan, Green Brook, N.J.

[73] Assignee: National Starch and Chemical Corporation, Bridgewater, N.J.

[21] Appl. No.: 831,245

[22] Filed: Feb. 19, 1986

[51] Int. Cl.$^4$ .............................................. B42D 1/00
[52] U.S. Cl. .................................. 281/15 R; 412/3; 412/4; 156/908; 281/36; 281/37
[58] Field of Search .............. 156/908; 412/3, 4; 281/15 R, 29, 35, 36, 37

[56] References Cited

U.S. PATENT DOCUMENTS

| | | | |
|---|---|---|---|
| 3,137,874 | 6/1964 | Hildmann et al. | 156/908 |
| 3,239,478 | 3/1966 | Harlan | 260/27 |
| 3,244,436 | 4/1966 | McKowen | 156/908 |
| 3,837,994 | 9/1974 | Flanagan et al. | 161/100 |
| 3,964,769 | 6/1976 | Shatzkin | 156/908 |
| 4,019,758 | 4/1977 | Heller et al. | 281/21 R |
| 4,091,487 | 5/1978 | Axelrod | 11/1 AD |
| 4,184,218 | 1/1980 | Hawkes | 156/908 |
| 4,187,572 | 2/1980 | Savich | 11/2 |
| 4,248,657 | 2/1981 | Henry | 156/908 |
| 4,374,441 | 2/1983 | Carter et al. | 412/3 |
| 4,405,156 | 9/1983 | Carter et al. | 281/29 |
| 4,420,282 | 12/1983 | Axelrod | 412/4 |
| 4,526,577 | 7/1985 | Schmidt et al. | 604/366 |
| 4,536,012 | 8/1985 | Hume, III | 281/21 R |
| 4,565,477 | 1/1986 | Axelrod | 412/5 |
| 4,615,541 | 10/1986 | Kwauka | 412/3 X |

OTHER PUBLICATIONS

U.S. Ser. No. 749,341 filed 06/27/85 (now allowed).
"Bookbinding" James B. Blaine, presented by Book Production Magazine; Freund Publishing Co., Inc., New York, New York.
"A New Look at Animal Glue for Casemaking" Nathan B. Leitner; Marketing Manager—Bookbinding/Graphic Arts; H. B. Fuller Company.
"Book Cover Warping" by the Book Manufacturing Institute, Spring 1985.
"STEREON® 840A for Hot Melt Adhesives Applications", Firestone Synthetic Rubber & Latex Company, Technical Serive Report 1/14/86.
"Good Tack and Open Time Help Animal Glue Hold Market Share", Adhesives Age, Jun. 1987.

*Primary Examiner*—Paul A. Bell
*Attorney, Agent, or Firm*—Ellen T. Dec; Edwin M. Szala

[57] ABSTRACT

A process for the formation of the hinge joints on bound book blocks using a hot melt pressure sensitive adhesive comprising:

(a) 20 to 35% by weight of an A-B-A block or A-B-A-B-A-B multi-block copolymer where the A component is styrene and the B component is butadiene or hydrogenated butadiene and the copolymer contains at least 28 parts styrene per 100 parts copolymer;
(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer.

12 Claims, No Drawings

HOT MELT ADHESIVE COMPOSITION FOR BOOK HINGE JOINT

BACKGROUND OF THE INVENTION

The present invention is directed to pressure sensitive hot melt adhesives used to form the hinge joint of a flexible covered book.

Flexible or soft covered books are generally formed by coating a layer of hot melt adhesive on the secured edge of a series of printed stocks or signatures to form a book block to which a paper backing or other suitable cover is applied to form the spine of the book. While this process produces the primary bonding of the book block to the cover, a secondary bond is often formed at the hinge or joint of the cover. This bond is produced by applying a small amount of adhesive to the outer sheet of each side of the book block immediately adjacent to the hinge area. This hinge joint formation is actually carried out in two separate steps with the adhesive being applied to the book block before the cover is affixed and the joint then being formed by application of pressure to the book cover at some point "downline" in the manufacturing operation. The purpose of this adhesive application is to conceal the binding adhesive and also to reinforce the binding and to prevent the book from falling apart relatively easily when grasped only by the flexible cover.

The adhesives used for this application must possess a variety of properties, specifically they must possess low viscosity (i.e., about 500 to 5000 cps at 350° F.) for easy application, strong agressive tack at the point of formation of the hinge bond, good adhesion to difficult cover stocks and resistance to creep or cold flow both at room temperature and under elevated temperature conditions. Heretofore the adhesives used have been either the non-pressure sensitive hot melt adhesives used in the book binding operation or emulsion adhesives. Both types of adhesives suffer from the common deficiency of their relatively short open time i.e., the time during which a bond may be found. This lack of open time, creates a serious problem in the automated book binding process where interruptions, slow downs or even shut downs of the manufacturing line result in loss of agressive tack properties with the subsequent need to discard large quantities of partially completed products. Another problem resulting from the finite open time of the adhesives of the prior art is the high rejection rate due to poorly formed joints caused by the relatively high coating weights which must be applied in order to assure the presence of the needed residual agressive tack at the time the hinge joint is formed, particularly when slow machine speeds are involved. Additional rejects are created with finite open time products, when appropriate thin coating weights are used for high production speeds, but when machine slows down or stops because of some other interruption in the binding line the thin coating weight causes solidification prior to bond formation and therefore no bond can be formed.

It is therefore an object of the present invention to provide an adhesive for the hinge joint of a flexible book which has the cohesive strength, cold flow resistance, etc. of previous adhesives without being limited with respect to loss of agressive tack over time.

This and other objects will be apparent from the description that follows.

SUMMARY OF INVENTION

We have now found that pressure sensitive hot melt adhesive compositions prepared from specific A-B-A type block and multi-block copolymers are particularly useful in the formation of hinge joints for flexible books.

Thus, the present invention is directed to a process for the formation of hinge joints on bound book blocks comprising the steps of applying a molten film of a hot melt pressure sensitive adhesive to the outer sheet of each side of the book block on an area immediately adjacent the bound edges and for a length substantially coterminus with the bound edges; applying a cover thereto; and exerting pressure on the book cover in the area of the pressure sensitive hot melt film; wherein the pressure sensitive hot melt adhesive comprises:

(a) 20 to 35% by weight of an A-B-A block or A-B-A-B-A-B multi-block copolymer where the A component is styrene and the B component is butadiene or hydrogenated butadiene and wherein the styrene is present in an amount of at least 28 parts per 100 parts compolymer;
(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer.

More particularly, the present invention is directed to the use of a hot melt adhesive composition especially adapted for the above described application, the hot melt adhesive containing as the block copolymer a multi-block styrene-butadiene copolymer containing at least 35 parts styrene per 100 parts copolymer.

DETAILED DESCRIPTION OF THE PREFERRED EMBODIMENTS

The primary component of the adhesive compositions used in the present invention are block or multi-block copolymers having the general configuration:

A-B-A or A-B-A-B-A-B- wherein the polymer blocks A are non-elastomeric styrene polymer blocks, while the elastomeric polymer blocks B are butadiene or butadiene which is partially or substantially hydrogenated as taught, for example, in U.S. Pat. No. 3,700,633. Selected conditions may be employed for example to hydrogenate the elastomeric butadiene block while not so modifying the styrene polymer blocks. Other conditions may be chosen to hydrogenate substantially uniformly along the polymer chain, both the elastomeric and non-elastomeric blocks thereof being hydrogenated to practically the same extent, which may be either partial or substantially complete. Further, they may be linear or branched. Typical branched structures contain an elastomeric portion with at least three branches which can radiate out from a central hub or can be otherwise coupled together.

Typical of the rubbery copolymers useful herein are the polystyrenepolybutadiene-polystyrene, and e.g. polystyrene-poly-(ethylenebutylene)polystyrene. These copolymers may be prepared using methods taught, for example, in U.S. Pat. Nos. 3,239,478; 3,427,269; 3,700,633; 3,753,936; and 3,932,327. Alternatively, some may be obtained from Shell Chemical Co. under the trademarks Kraton 1101, 1102, 1650, 1652 and 1657 and from Phillips Chemical Co. under the trademarks Solprene 418 and 423.

Most preferred for use herein are the linear A-B-A-B-A multi-block copolymers where the elastomeric block is butadiene and the nonelastomeric block is styrene and the latter is present in relatively high concentrations, i.e. at levels of 35% or above. Block copolymers marketed commercially at this time which meet the above described requirements are available from Firestone under the tradenames Stereon 840A (57 parts butadiene and 43 parts styrene) and Stereon SR 7092 (50 parts butadiene and 50 parts styrene). Blends of these high styrene containing copolymers with other compatible block copolymers may also be employed.

The tackifying resins useful in the adhesive compositions can be hydrocarbon resins, synthetic polyterpenes, rosin esters, natural terpenes, and the like. More particularly, the useful tackifying resins include any compatible resins or mixtures thereof such as (1) natural and modified rosins such, for example, as gum rosin, wood rosin, talloil rosin, distilled rosin, hydrogenated rosin, dimerized rosin, and polymerized rosin; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natured terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terepene hydrocarbons, such as the bicylic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the codensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be required for some formulations.

The selection of the particular tackifying agent is, in large part, dependent upon the specific block copolymer employed. The preferred adhesive formulations for use herein which employ the linear multi-block Stereon type copolymers provide optimum properties when tackifiers of modified terpene having ring and ball softening point of about 100°-120° C. such as Zonatac 105 are employed.

Among the applicable stabilizers of antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and, correspondingly, its reactivity; this steric hindrance thus providing the phenolic compound with its stabilizing properties. Representative hindered phenols include: 1,3,5-trimethyl 2,4,6-tris(3,5-di-tert-butyl-4-hydroxybenzyl)benzene; pentaerythrityl tetrakis-3(3,5-di-tert-butyl-4-hydroxyphenyl)propionate; n-octadecyl-3(3,5-di-tert-butyl-4-hydroxyphenyl)-propionate; 4,4'-methylenbis(2,6-tert-butylphenol); 4,4'-thiobis(6-tert-butyl-o-cresol); 2,6-di-tertbutylphenol; 6-(4-hydroxyphenoxy)-2,4-bis(n-octyl-thio)-1,3,5triazine; di-n-octadecyl 3,5-di-tert-butyl-4-hydroxy-benzylphosphonate; 2-(n-octylthio)ethyl 3,5-di-tert-butyl-4-hydroxy-benzoate; and sorbitol hexa[3-(3,5-di-tert-butyl-4-hydroxyphenyl)-propionate].

The performance of these antioxidants may be further enhanced by utilizing, in conjunction therewith known synergists such, for example, as thiodipropionate esters and phosphites, particularly useful is di-stearylthiodipropionate.

These stabilizers, if used, are generally present in amounts of about 0.1 to 1.5 weight percent, preferably 0.25 to 1.0%.

Various plasticizing or extending oils are also present in the composition in amounts of 5% to about 30%, preferably 5 to 25%, by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed are relatively high boiling materials containing only a minor proprotion of aromatic hydrocarbons (preferably less than 30% and, more particularly, less than 15% by weight of the oil). Alternatively, the oil may be totally non-aromatic. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

Various petroleum derived waxes may also be used in amounts less than about 15% by weight of the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of 130°-225° F. as well as synthetic waxes such a low molecular weight polyethylene or Fisher-Tropsch waxes.

Additionally there may be added to the hot melt adhesive composition up to about 10% by weight of an ethylene vinyl acetate copolymer containing 17 to 42% vinyl acetate as a reinforcing agent and to promote adhesive to certain substrates. The adhesive compositions are prepared by blending the components in the melt at a temperature of about 130°-200° C. until a homogeneous blend is obtained, approximately 2 hours. Various methods of blending are known to the art and any method that produces a homogeneous blend is satisfactory.

The resultant adhesives are used to form the hinge joint using methods conventional in the book binding art and without limitation to the particular binding method employed. Thus the book block may be bound by any of the usual procedures, including, but not limited to, perfect binding with hot melt adhesive, burst binding with emulsion adhesive and then with hot melt adhesive; sewn and glued off with emulsion adhesive; or perfect or burst bound with emulsion adhesive. The hinge joint may be formed on any book construction, i.e., a flexible or soft cover book or a book block which will eventually be hard bound or case bound book, but wherein a hinge joint is formed between the book block and the combined end sheets. In general, regardless of the method of construction, a film of a non-pressure sensitive adhesive is coated on the secured edges of the book block; then a molten film of the hot melt pressure sensitive adhesive described previously is coated on the outer sheet of each side of the book block on an area immediately adjacent the secured edges and for a length substantially coterminus therewith; the flexible cover is applied to the first film while the latter is still in the uncured state and pressure is exerted on the book cover in the area of the pressure sensitive hot melt film to form the hinge joint. Alternatively, the hinge or joint hot melt adhesive may be applied in appropriate lines to the flexible cover as the cover is fed on the binder to meet to the book block.

This invention can be further illustrated by the following examples or preferred embodiments thereof, although it will be understood that these examples are included merely for purposes of illustration and are not intended to limit the scope of the invention unless otherwise specifically indicated.

EXAMPLE

Ten parts white USP mineral oil and 0.2 parts Irganox 1010 antioxidant where blended with 21 parts Stereon 840A at 325° F. When the blend was homogeneous, 9 additional parts oil were added followed by 60 parts Zonatac 105 Lite, a modified terpene tackifier.

The resulting pressure sensitive adhesive (designated Adhesive A) exhibited a viscosity (Brookfield Thermosel Viscometer) of 1355 at 325° F. and 8060 at 250° F.

A similar adhesive (designated Adhesive B) was prepared using 20 parts Stereon 840 and 50 parts Permalyn 105N (a Pentaerythritol ester of rosin from Hercules), as a tackifier.

A third adhesive (designated Adhesive C) was prepared using 60 parts of the Permalyn 105N with 22 parts Stereon SR 7092 (a multi-block copolymer from Firestone containing 50% styrene).

The hot melt adhesive compositions were applied at a coating weight of 3-5 mils onto book cover stock (Federal Paperboard Company—9 point stock) and bonded to a second sheet of the cover stock. One inch wide strips were then pulled apart on an Instron Testing Machine at a rate of 2 inches per minute and the force required to break the bond as well as the type of failure were recorded. The results are shown in Table I.

TABLE I

| Adhesive | Force (lbs) | Type Failure |
|----------|-------------|--------------|
| A | 8.2 | fiber tear |
| B | 4.0 | cohesive |
| C | 9.5 | fiber tear |

A soft bound (flexible cover) book was bound using conventional manufacturing procedures and applying the adhesive designated "A" as a joint adhesive. The book weighed 485 grams and was 10 inch tall, 6¾ inch wide are ⅝ inch thick. The book was suspended by the front cover with the weight f the book pulling on the joint adhesive bond. After 1 week suspension, no bond failure was observed.

Similar results would be obtained using other hot melt pressure sensitive adhesive compositions based on styrene-butadiene block copolymers provided the styrene is present in an amount of at least about 28 parts per 100 parts copolymer.

We claim:

1. A process for the formation of hinge joints on bound book blocks comprising the steps of applying a molten film of a hot melt adhesive to the outer sheet of each side of the book block on an area immediately adjacent the bound edges and for a length substantially coterminus with the bound edges; applying a cover thereto and exerting pressure on the book cover in the area of the hot melt film wherein the a hot melt adhesive is a pressure sensitive adhesive composition comprising:
    (a) 20 to 35% by weight of an A-B-A-B-A-B block or multi-block copolymer where the A component is styrene and the B component is butadiene or hydrogenated butadiene; and wherein the styrene is present in an amount of at least 28 parts per 100 parts copolymer;
    (b) 45 to 70% by weight of a compatible tackifying resin;
    (c) 5 to 30% by weight of a plasticizing oil;
    (d) 0 to 5% by weight of a petroleum derived wax; and
    (e) 0.1 to 2% by weight of a stabilizer.

2. The process of claim 1 wherein the tackifier in the hot melt pressure sensitive adhesive composition is any compatible resin or mixture thereof selected from the group consisting of (1) natural and modified rosins; (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof: (6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

3. The process of claim 1 where there is additionally present in the hot melt pressure sensitive adhesive composition up to 10% of an ethylene vinyl acetate copolymer containing 17 to 42% vinyl acetate.

4. A book produced by the process of claim 1.

5. A process for the formation of hinge joints on bound book blocks comprising the steps of applying a molten film of a hot melt adhesive to the outer sheet of each side of the book block on an area immediately adjacent the bound edges and for a length substantially coterminus with the bound edges; applying a cover thereto and exerting pressure on the book cover in the area of the hot melt film wherein the hot melt adhesive is a pressure sensitive adhesive composition comprising:
    (a) 20 to 35% by weight of an A-B-A-B-A-B multi-block copolymer wherein the A component is styrene and the B component is butadiene and wherein the styrene component is present in an amount of at least 35 parts per 100 parts of the copolymer;

(b) 45 to 70% by weight of a compatible tackifying resin;
(c) 5 to 30% by weight of a plasticizing oil;
(d) 0 to 5% by weight of a petroleum derived wax; and
(e) 0.1 to 2% by weight of a stabilizer.

6. The process of claim 5 wherein the block copolymer in the adhesive comprises 57 parts butadiene and 43 parts styrene.

7. The process of claim 5 wherein the block copolymer in the adhesive comprises 50 parts butadiene and 50 parts styrene.

8. The process of claim 5 wherein the tackifier in the hot melt adhesive composition is any compatible resin or mixture thereof selected from the group consisting of (1) natural and modified rosins; (2) glycerol and pentaerythritol esters of natural and modified rosins; (3) copolymers and terpolymers of natured terpenes; (4) polyterpene resins having a softening point, as determined by ASTM method E28-58T, of from about 80° to 150° C.; (5) phenolic modified terpene resins and hydrogenated derivatives thereof;(6) aliphatic petroleum hydrocarbon resins having a Ball and Ring softening point of from about 70° to 135° C.; (7) aromatic petroleum hydrocarbon resins and the hydrogenated derivatives thereof; and (8) alicyclic petroleum hydrocarbon resins and the hydrogenated derivatives thereof.

9. The process of claim 8 wherein the tackifying resin in the adhesive is a modified terpene resin having a Ring and Ball softening part of about 100°–120° C.

10. The process of claim 8 wherein the tackifying resin in the adhesive is an aromatic petroleum hydrocarbon resin of hydrogenated derivative thereof.

11. The process of claim 5 where there is additionally present in the hot melt pressure sensitive adhesive composition up to 10% of an ethylene vinyl acetate copolymer containing 17 to 42% vinyl acetate.

12. A book produced by the process of claim 5.

* * * * *